United States Patent
Resendiz

(10) Patent No.: US 11,434,116 B2
(45) Date of Patent: Sep. 6, 2022

(54) VEHICLE JACKING ASSEMBLY

(71) Applicant: Manuel Resendiz, Los Banos, CA (US)

(72) Inventor: Manuel Resendiz, Los Banos, CA (US)

(*) Notice: Subject to any disclaimer, the term of this patent is extended or adjusted under 35 U.S.C. 154(b) by 173 days.

(21) Appl. No.: 16/823,931

(22) Filed: Mar. 19, 2020

(65) Prior Publication Data

US 2021/0292141 A1 Sep. 23, 2021

(51) Int. Cl.
*B66F 3/46* (2006.01)
*B66F 3/44* (2006.01)
*B66F 3/25* (2006.01)
*B60S 9/12* (2006.01)

(52) U.S. Cl.
CPC ............... *B66F 3/46* (2013.01); *B60S 9/12* (2013.01); *B66F 3/25* (2013.01); *B66F 3/44* (2013.01)

(58) Field of Classification Search
CPC ...... B66F 3/46; B66F 3/25; B66F 3/44; B60S 9/12
USPC ........................................................ 254/423
See application file for complete search history.

(56) References Cited

U.S. PATENT DOCUMENTS

| | | | |
|---|---|---|---|
| 2,109,238 A | 2/1938 | Sessions | |
| 2,473,757 A | 6/1949 | Long | |
| 4,993,688 A | 2/1991 | Mueller | |
| 5,176,391 A * | 1/1993 | Schneider | B60G 17/005 180/41 |
| 5,188,379 A | 2/1993 | Krause | |
| D348,966 S | 7/1994 | Guyton | |
| 5,636,830 A | 6/1997 | Chartrand | |
| 5,722,641 A | 3/1998 | Martin | |
| 6,079,742 A * | 6/2000 | Spence | B25B 21/002 254/423 |
| 7,004,457 B2 * | 2/2006 | Jackson, Sr. | B60S 9/12 254/423 |
| 7,243,907 B2 | 7/2007 | Singh | |
| 10,266,158 B2 * | 4/2019 | Wilson | B60S 9/04 |
| 10,364,134 B2 * | 7/2019 | Anzola | B66C 23/78 |
| 10,457,536 B2 * | 10/2019 | Jaipaul | H04B 7/24 |
| 2007/0239374 A1 * | 10/2007 | Dougherty | G01R 31/392 702/63 |

* cited by examiner

*Primary Examiner* — Seahee Hong

(57) ABSTRACT

A vehicle jacking assembly for raising a vehicle includes a plurality of cylinders, each of which is configured to couple to a frame of a vehicle proximate to a respective wheel of the vehicle. The cylinder comprises a plurality of nested sections so that the cylinder is selectively extensible. An actuator that is coupled to the vehicle is operationally coupled to the plurality of cylinders and an electrical circuit of the vehicle. The actuator is positioned to selectively actuate the plurality of cylinders to extend the cylinders from the frame of the vehicle so that the cylinders contact a surface. The plurality of cylinders thus is configured to raise the vehicle.

14 Claims, 9 Drawing Sheets

VEHICLE JACKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to jacking assemblies and more particularly pertains to a new jacking assembly for raising a vehicle.

BRIEF SUMMARY OF THE INVENTION

An embodiment of the disclosure meets the needs presented above by generally comprising a plurality of cylinders, each of which is configured to couple to a frame of a vehicle proximate to a respective wheel of the vehicle. The cylinder comprises a plurality of nested sections so that the cylinder is selectively extensible. An actuator that is coupled to the vehicle is operationally coupled to the plurality of cylinders and an electrical circuit of the vehicle. The actuator is positioned to selectively actuate the plurality of cylinders to extend the cylinders from the frame of the vehicle so that the cylinders contact a surface. The plurality of cylinders thus is configured to raise the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
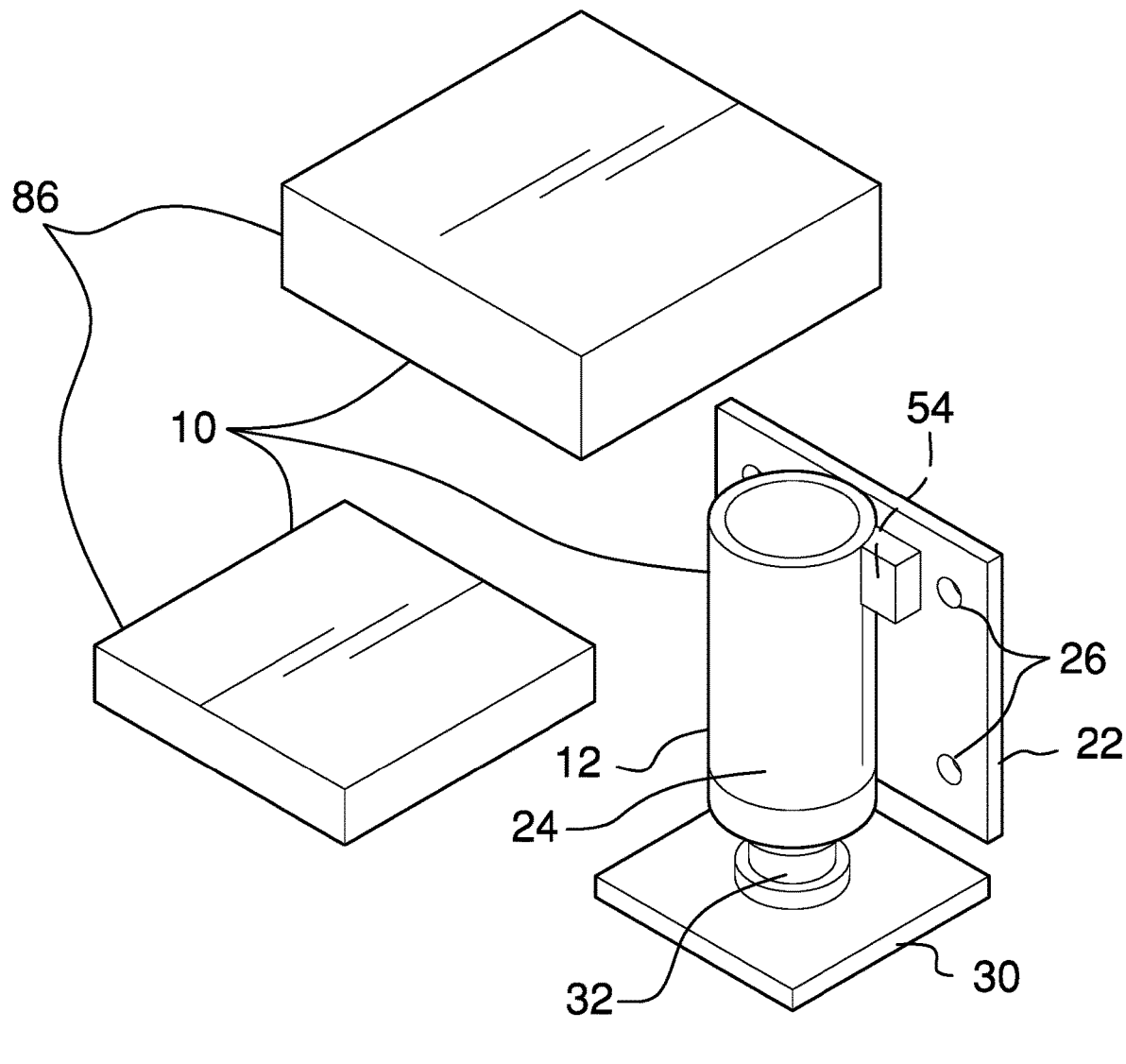
FIG. 1 is an isometric perspective view of a vehicle jacking assembly according to an embodiment of the disclosure.

With reference now to the drawings, and in particular to FIGS. 1 through 10 thereof, a new jacking assembly embodying the principles and concepts of an embodiment of the disclosure and generally designated by the reference numeral 10 will be described.

As best illustrated in FIGS. 1 through 10, the vehicle jacking assembly 10 generally comprises a plurality of cylinders 12, each of which is configured to couple to a frame 14 of a vehicle 16 proximate to a respective wheel 18 of the vehicle 16. The cylinder 12 comprises a plurality of nested sections 20 so that the cylinder 12 is selectively extensible. The plurality of nested sections 20 comprises four nested sections 20. The plurality of cylinders 12 comprises four cylinders 12 so that each cylinder 12 is coupled to the frame 14 proximate to a respective wheel 18 of the vehicle 16.

The present invention anticipates the plurality of cylinders 12 being couplable to the frame 14 of the vehicle 16, such as through bolting and welding, so that the assembly 10 can be added as an aftermarket addition to the vehicle 16. The present invention also anticipates the plurality of cylinders 12 being incorporated during manufacturing of the vehicle 16 so that the assembly 10 is integral to the vehicle 16.

Figure 2:
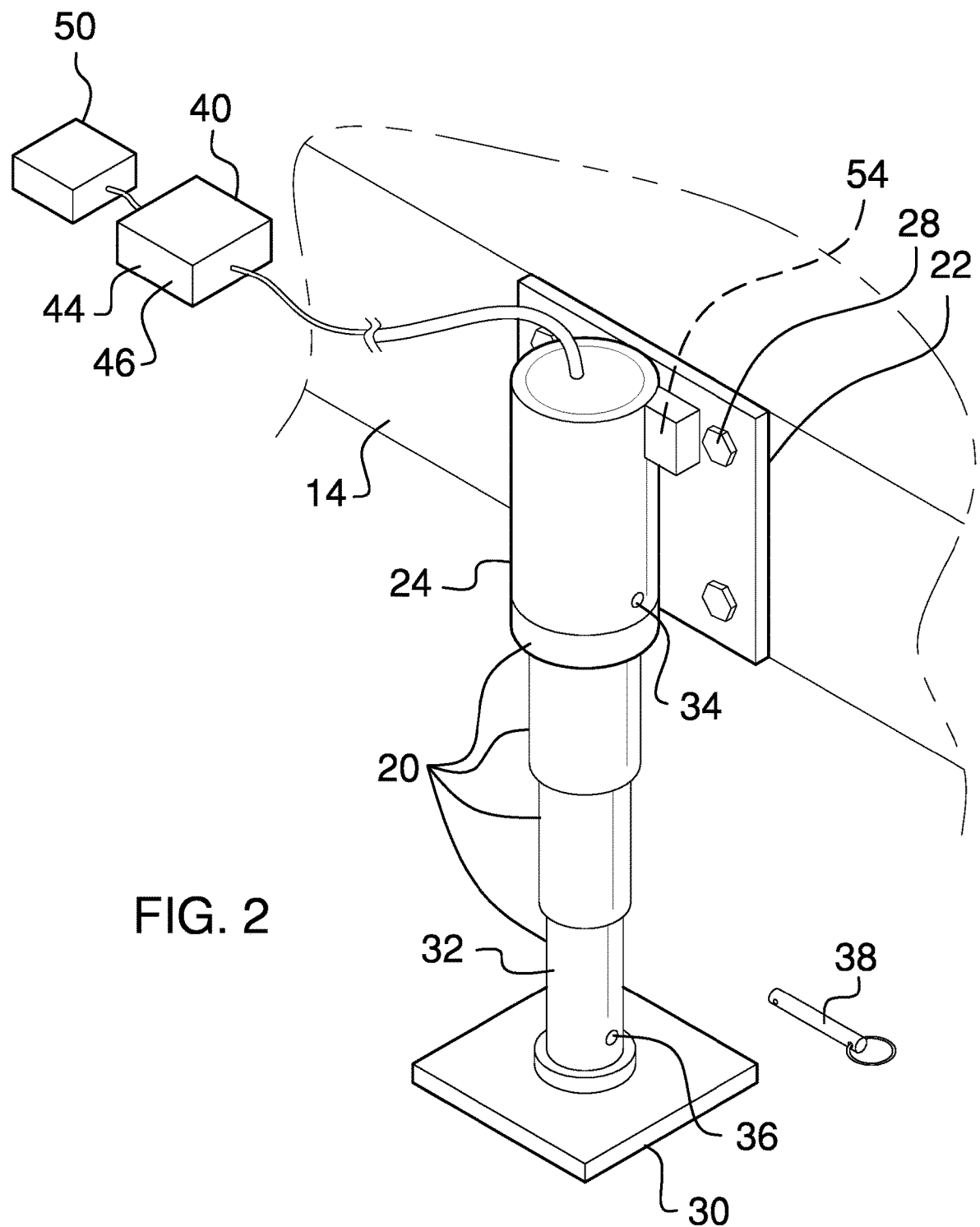
FIG. 2 is an isometric perspective view of an embodiment of the disclosure.
Figure 3:
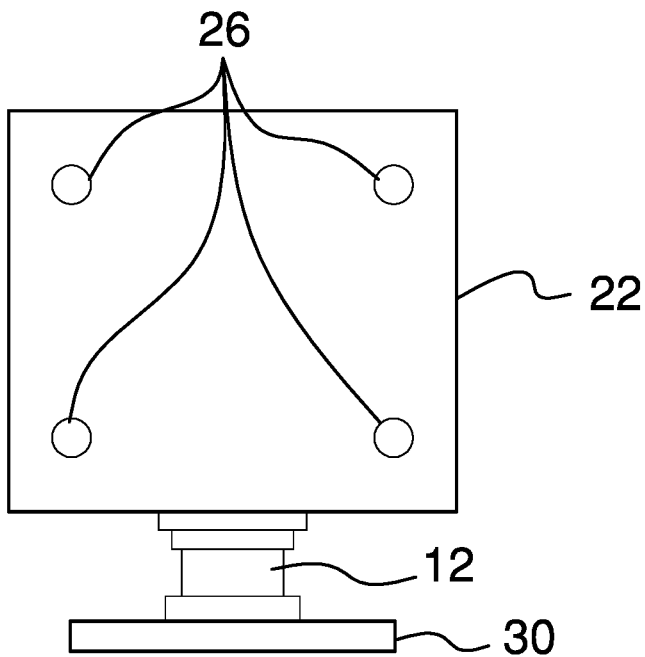
FIG. 3 is a back view of an embodiment of the disclosure.
Figure 4:
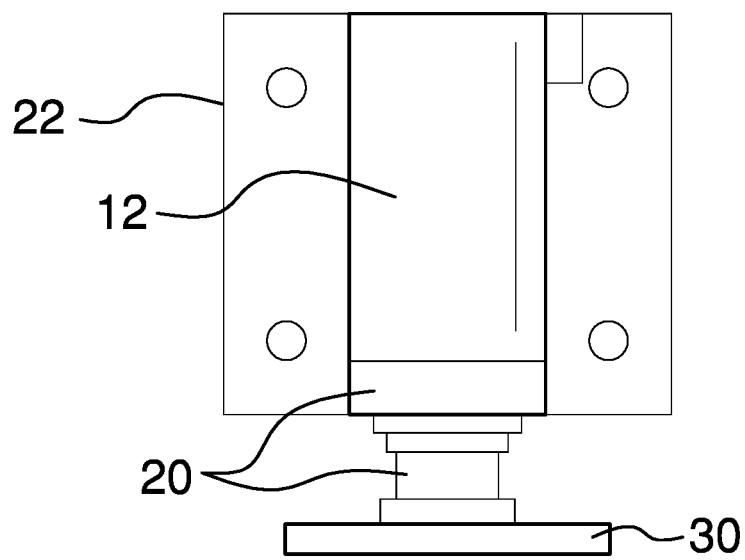
FIG. 4 is a front view of an embodiment of the disclosure.
Figure 5:
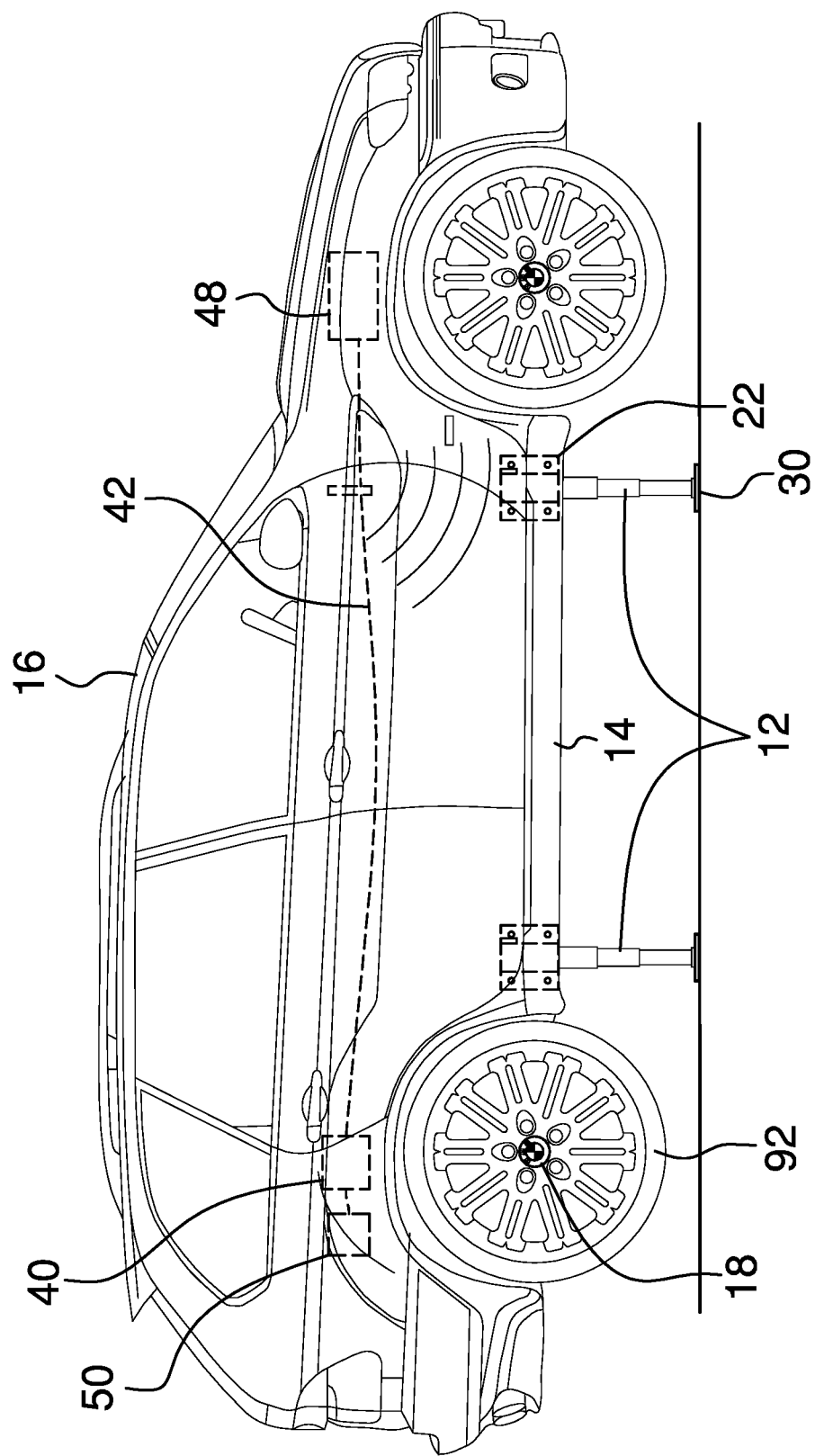
FIG. 5 is an in-use view of an embodiment of the disclosure.

Each cylinder 12 comprises a first plate 22 that is coupled to an outermost nested section 24. The first plate 22 is rectangularly shaped. Each of a plurality of holes 26 that is positioned through the first plate 22 is configured to insert an article of mounting hardware, such as a bolt 28 as shown in FIG. 2, to couple the first plate 22 to the frame 14 of the vehicle 16.

A second plate 30 is coupled to an innermost nested section 32 so that the plurality of nested sections 20 extends perpendicularly from the second plate 30. The second plate 30 is configured to stabilize the cylinder 12 on a surface when the cylinder 12 is extended between the frame 14 of the vehicle 16 and the surface.

A first aperture 34 is positioned in the outermost nested section 24. A second aperture 36 positioned in the innermost nested section 32 so that the second aperture 36 is aligned with the first aperture 34 when the plurality of nested sections 20 is in a retracted configuration. A pin 38 is selectively insertable into the first aperture 34 and the second aperture 36 to lock the plurality of nested sections 20 in the retracted configuration. The pin 38 is used to lock the cylinder 12 for long distance road trips or for purposes of an emergency.

An actuator 40 that is coupled to the vehicle 16 is operationally coupled to the plurality of cylinders 12 and to an electrical circuit 42 of the vehicle 16. The actuator 40 is positioned to selectively actuate the plurality of cylinders 12 to extend the cylinders 12 from the frame 14 of the vehicle 16 so that the cylinders 12 contact a surface. The plurality of cylinders 12 thus is configured to raise the vehicle 16.

The actuator 40 comprises at least one of an electric motor 44 and a hydraulic motor 46. The present invention also anticipates the actuator 40 being removably coupled to the vehicle 16 so that it can be positioned outside of the vehicle 16 when in use. The present invention also anticipates the actuator 40 being operationally coupled to an electronic control unit (ECU) 48 of the vehicle 16. The ECU 48 would be programmed to only allow operation of the actuator 40 when the vehicle 16 is parked.

A battery 50 is operationally coupled to the actuator 40 so that the battery 50 is positioned to power the actuator 40. The battery 50 is rechargeable and is operationally coupled to an electrical circuit 42 of the vehicle 16 so that the battery 50 is configured to receive a charge from an alternator 52 of the vehicle 16.

Figure 9:
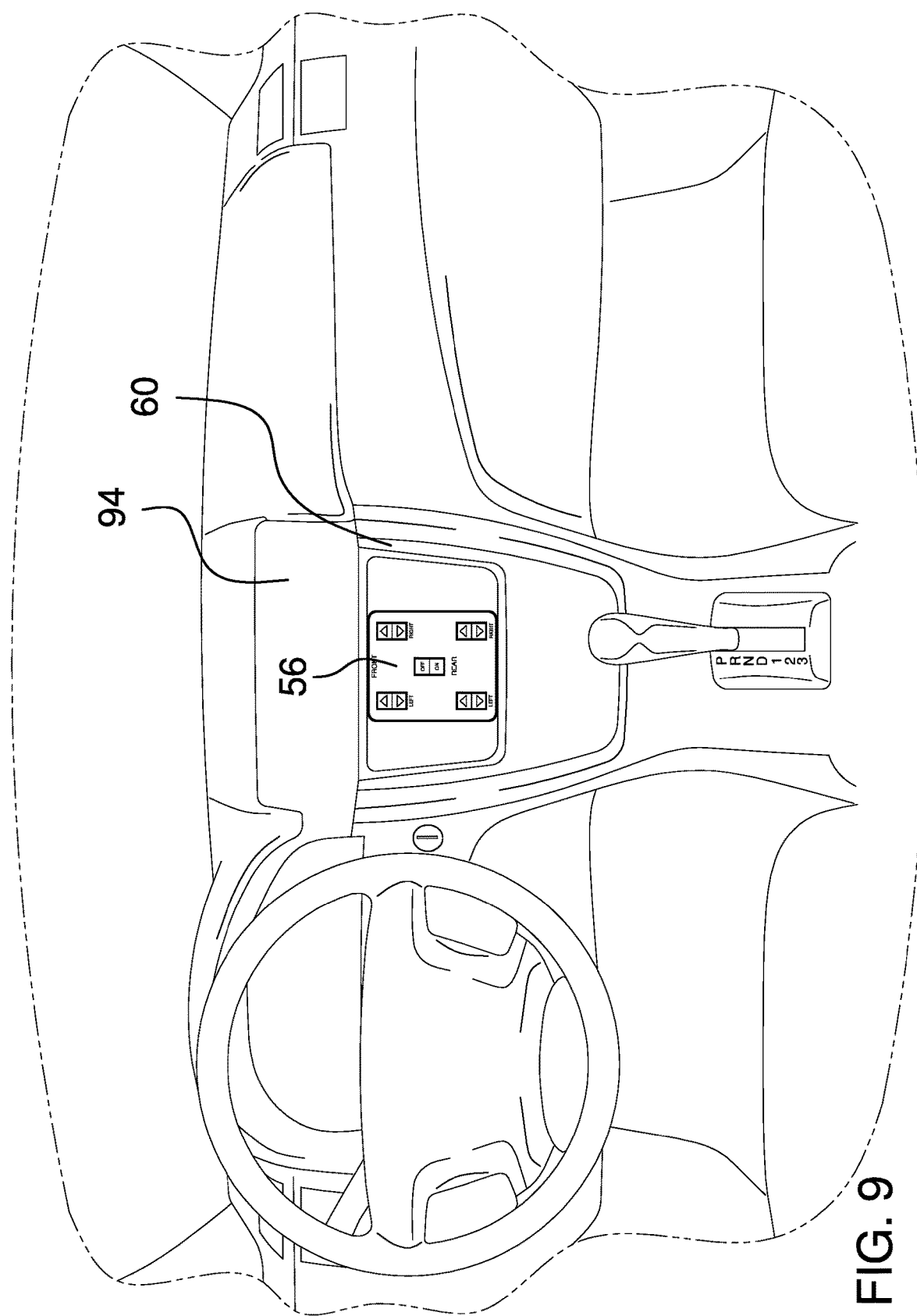
FIG. 9 is a front view of an embodiment of the disclosure.
Figure 10:
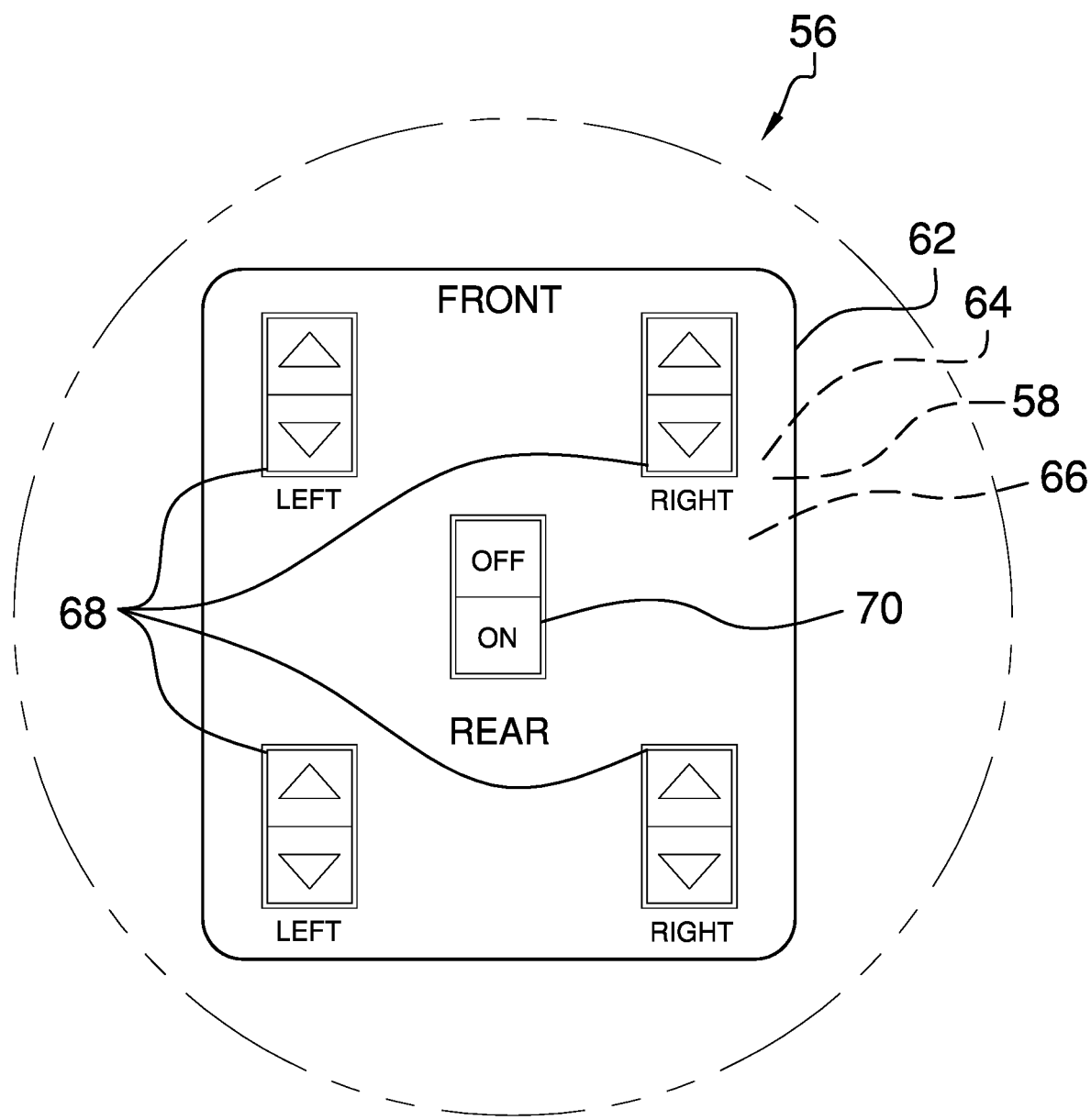
FIG. 10 is a front view of an embodiment of the disclosure.

Each of a plurality of receivers 54 is operationally coupled to a respective cylinder 12. A fixed controller 56, which comprises a fixed transmitter 58, is coupled to an interior surface 94 of the vehicle 16, such as to a dash 60 of the vehicle 16 as shown in FIG. 9. The fixed controller 56 is positioned to selectively signal a respective receiver 54 to actuate an associated cylinder 12 to extend the associated cylinder 12 from the frame 14 of the vehicle 16 so that the associated cylinder 12 contacts the surface to raise the vehicle 16.

The fixed controller 56 comprises a fixed housing 62 that defines an interior space 64. The fixed transmitter 58 and a fixed microprocessor 66 are coupled to the fixed housing 62 and are positioned in the interior space 64. The fixed microprocessor 66 is operationally coupled to the fixed transmitter 58 and to an electrical circuit 42 of the vehicle 16. A plurality of fixed switches 68 that is coupled to the fixed housing 62 is operationally coupled to the fixed microprocessor 66. Each fixed switch 68 is configured to be selectively switched to signal the fixed microprocessor 66 to command the fixed transmitter 58 to signal an associated receiver 54 to actuate an associated cylinder 12 to extend the associated cylinder 12 from the frame 14 of the vehicle 16 so that the associated cylinder 12 contacts the surface to raise the vehicle 16. A power button 70 that is coupled to the fixed housing 62 is operationally coupled to the fixed microprocessor 66 and is configured to selectively activate the fixed controller 56.

Figure 8:
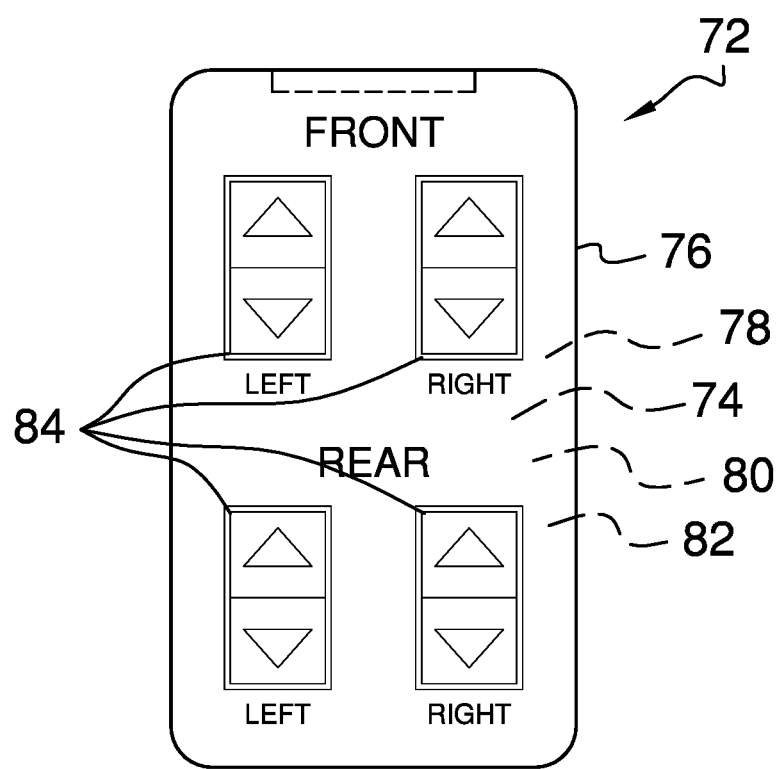
FIG. 8 is a front view of an embodiment of the disclosure.

The assembly 10 also comprises a remote controller 72, as shown in FIG. 8. The remote controller 72 comprises a remote transmitter 74 so that the remote controller 72 is positioned to selectively signal a respective receiver 54 to actuate an associated cylinder 12 to extend the associated cylinder 12 from the frame 14 of the vehicle 16 so that the associated cylinder 12 contacts the surface to raise the vehicle 16.

The remote controller 72 comprises a remote housing 76 that defines an internal space 78. The remote transmitter 74, a remote battery 80, and a remote microprocessor 82 are coupled to the remote housing 76 and are positioned in the internal space 78. The remote microprocessor 82 is operationally coupled to the remote battery 80 and the remote transmitter 74. A plurality of remote switches 84 that is coupled to the remote housing 76 is operationally coupled to the remote microprocessor 82. Each remote switch 84 is configured to be selectively switched to signal the remote microprocessor 82 to command the remote transmitter 74 to signal an associated receiver 54 to actuate an associated cylinder 12 to extend the associated cylinder 12 from the frame 14 of the vehicle 16 so that the associated cylinder 12 contacts the surface to raise the vehicle 16.

Figure 6:
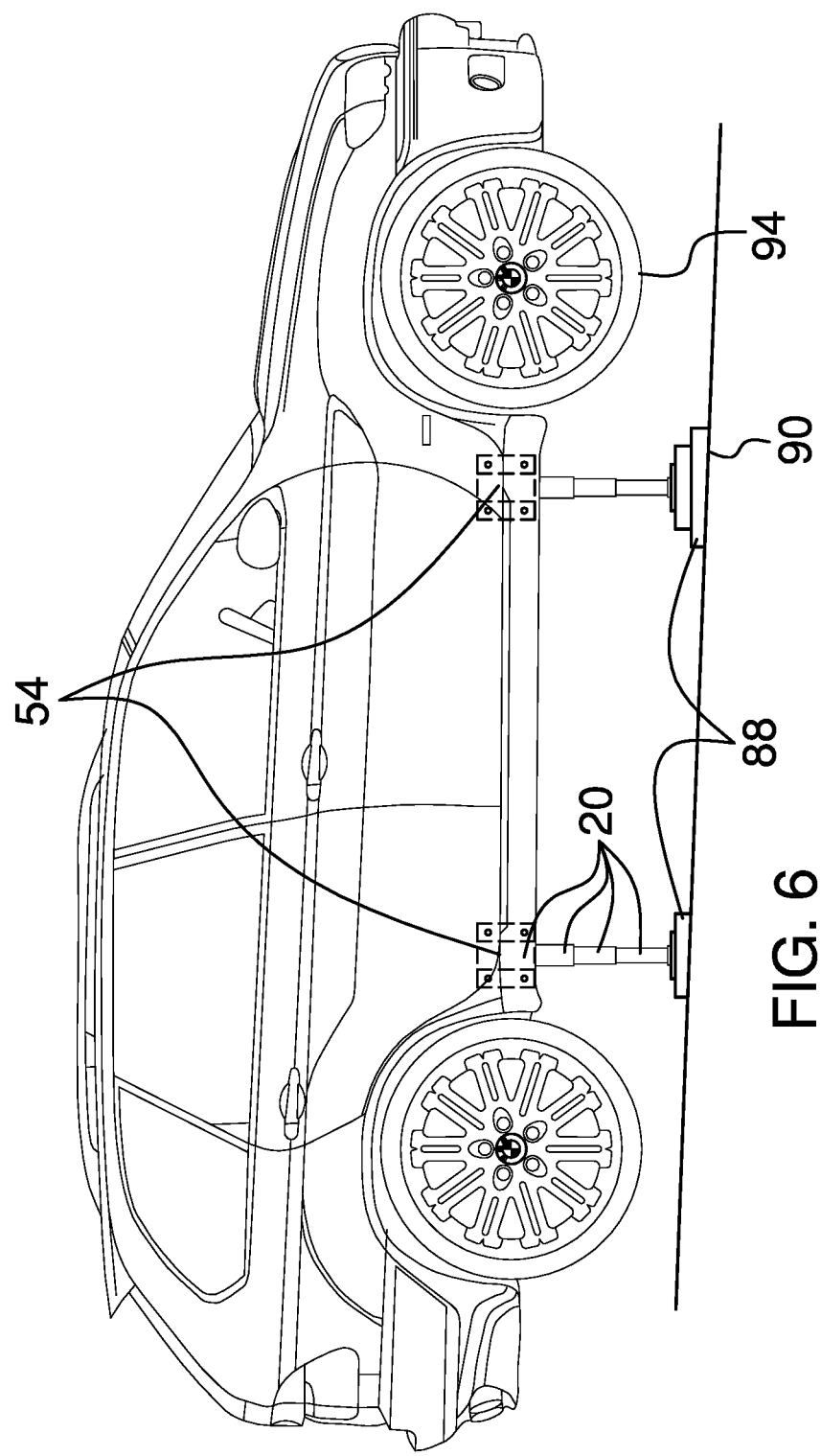
FIG. 6 is an in-use view of an embodiment of the disclosure.
Figure 7:
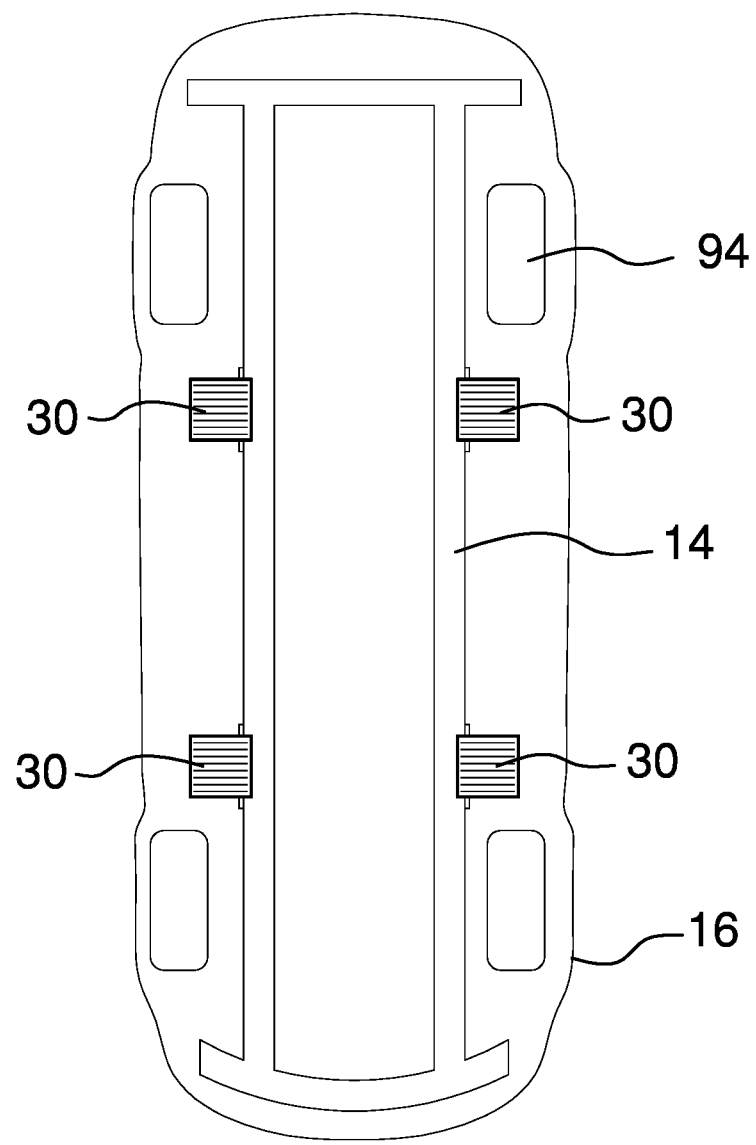
FIG. 7 is a bottom view of an embodiment of the disclosure.

The assembly 10 also comprises a plurality of pads 86. Each pad 86 is selectively positionable on the surface below a respective cylinder 12 so that the pad 86 is positioned to contact a respective second plate 30 as the respective cylinder 12 is extended from the frame 14. The pad is configured to stabilize the vehicle 16 on the surface. The pads 86 comprise at least one of hardened rubber and carbon fiber so that the pads are substantially incompressible. The plurality of pads 86 comprises a set of first pads 88 and a set of second pads 90. Each second pad 90 is circumferentially larger than a respective first pad 88. The second pad 90 is configured to provide greater stabilization than the respective first pad 88. The respective first pad 88 also can be stacked on second pad 90 the so as to further elevate the vehicle 16 from the surface, as shown in FIG. 6.

In use, a user would utilize either the fixed controller 56 or the remote controller 72 to selectively extend a respective cylinder 12 to raise an associated wheel 18 to change a tire 92 on the wheel 18 in event of a flat. Should the user need to work on the vehicle 16 from below, all the cylinders 12 can be extended to raise the entire vehicle 16 to a working height.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:
1. A vehicle jacking assembly comprising:
   a plurality of cylinders, each cylinder being configured for coupling to a frame of a vehicle proximate to a respec- tive wheel of the vehicle, the cylinder comprising a plurality of nested sections such that the cylinder is selectively extensible;
an actuator coupled to the vehicle, the actuator being operationally coupled to the plurality of cylinders and an electrical circuit of the vehicle such that the actuator is positioned for selectively actuating the plurality of cylinders for extending the cylinders from the frame of the vehicle such that the cylinders contact a surface wherein the plurality of cylinders is configured for raising the vehicle;
each cylinder comprising
a first plate coupled to an outermost nested section,
a plurality of holes positioned through the first plate wherein each hole is configured for inserting an article of mounting hardware for coupling the first plate to the frame of the vehicle, and
a second plate coupled to an innermost nested section such that the plurality of nested sections extends perpendicularly from the second plate wherein the second plate is configured for stabilizing the cylinder on the surface when the cylinder is extended between the frame of the vehicle and the surface; and
a plurality of pads, each pad being selectively positionable on the surface below a respective cylinder such that the pad is positioned for contacting a respective second plate as the respective cylinder is extended from the frame wherein the pad is configured for stabilizing the vehicle on the surface, the plurality of pads comprising a set of first pads and a set of second pads, each second pad being circumferentially larger than a respective first pad wherein the second pad is configured for providing greater stabilization than the respective first pad.

2. The assembly of claim 1, further comprising:
the plurality of nested sections comprising four nested sections; and
the plurality of cylinders comprising four cylinders such that each cylinder is coupled to the frame proximate to the respective wheel of the vehicle.

3. The assembly of claim 1, further including the first plate being rectangularly shaped.

4. The assembly of claim 1, further comprising:
a first aperture positioned in the outermost nested section;
a second aperture positioned in the innermost nested section such that the second aperture is aligned with the first aperture when the plurality of nested sections is in a retracted configuration; and
a pin selectively insertable into the first aperture and the second aperture for locking the plurality of nested sections in the retracted configuration.

5. The assembly of claim 1, further including the actuator comprising at least one of an electric motor and a hydraulic motor.

6. The assembly of claim 1, further including a battery operationally coupled to the actuator such that the battery is positioned for powering the actuator.

7. The assembly of claim 6, further including the battery being rechargeable, the battery being operationally coupled to the electrical circuit of the vehicle such that the battery is configured for receiving a charge from an alternator of the vehicle.

8. The assembly of claim 1, further comprising:
a plurality of receivers, each receiver being operationally coupled to a respective cylinder; and
a fixed controller coupled to an interior surface of the vehicle, the fixed controller comprising a fixed transmitter such that the fixed controller is positioned for selectively signaling a respective receiver for actuating an associated cylinder for extending the associated cylinder from the frame of the vehicle such that the associated cylinder contacts the surface wherein the plurality of cylinders is configured for raising the vehicle.

9. The assembly of claim 8, further the fixed controller comprising:
a fixed housing defining an interior space, the fixed transmitter being coupled to the fixed housing and positioned in the interior space;
a fixed microprocessor coupled to the fixed housing and positioned in the interior space, the fixed microprocessor being operationally coupled to the fixed transmitter and to the electrical circuit of the vehicle; and
a plurality of fixed switches coupled to the fixed housing, the fixed switches being operationally coupled to the fixed microprocessor wherein each fixed switch is configured for selectively switching for signaling the fixed microprocessor for commanding the fixed transmitter for signaling an associated receiver for actuating an associated cylinder for extending the associated cylinder from the frame of the vehicle such that the associated cylinder contacts the surface wherein the plurality of cylinders is configured for raising the vehicle.

10. The assembly of claim 9, further including a power button coupled to the fixed housing, the power button being operationally coupled to the fixed microprocessor wherein the power button is configured for selectively activating the fixed controller.

11. The assembly of claim 1, further comprising:
a plurality of receivers, each receiver being operationally coupled to a respective cylinder; and
a remote controller comprising a remote transmitter such that the remote controller is positioned for selectively signaling a respective receiver for actuating an associated cylinder for extending the associated cylinder from the frame of the vehicle such that the associated cylinder contacts the surface wherein the plurality of cylinders is configured for raising the vehicle.

12. The assembly of claim 11, further including the remote controller comprising:
a remote housing defining an internal space, the remote transmitter being coupled to the remote housing and positioned in the internal space;
a remote battery coupled to the remote housing and positioned in the internal space;
a remote microprocessor coupled to the remote housing and positioned in the internal space, the remote microprocessor being operationally coupled to the remote battery and the remote transmitter; and
a plurality of remote switches coupled to the remote housing, the remote switches being operationally coupled to the remote microprocessor wherein each remote switch is configured for selectively switching for signaling the remote microprocessor for commanding the remote transmitter for signaling an associated receiver for actuating an associated cylinder for extending the associated cylinder from the frame of the vehicle such that the associated cylinder contacts the surface wherein the plurality of cylinders is configured for raising the vehicle.

13. The assembly of claim 1, further including the pads comprising at least one of hardened rubber and carbon fiber.

14. A vehicle jacking assembly comprising:
a plurality of cylinders, each cylinder being configured for coupling to a frame of a vehicle proximate to a respective wheel of the vehicle, the cylinder comprising a plurality of nested sections such that the cylinder is selectively extensible, the plurality of nested sections comprising four nested sections, the plurality of cylinders comprising four cylinders such that each cylinder is coupled to the frame proximate to the respective wheel of the vehicle, each cylinder comprising:
 a first plate coupled to an outermost nested section, the first plate being rectangularly shaped,
 a plurality of holes positioned through the first plate wherein each hole is configured for inserting an article of mounting hardware for coupling the first plate to the frame of the vehicle,
 a second plate coupled to an innermost nested section such that the plurality of nested sections extends perpendicularly from the second plate wherein the second plate is configured for stabilizing the cylinder on a surface when the cylinder is extended between the frame of the vehicle and the surface,
 a first aperture positioned in the outermost nested section,
 a second aperture positioned in the innermost nested section such that the second aperture is aligned with the first aperture when the plurality of nested sections is in a retracted configuration, and
 a pin selectively insertable into the first aperture and the second aperture for locking the plurality of nested sections in the retracted configuration;
an actuator coupled to the vehicle, the actuator being operationally coupled to the plurality of cylinders and an electrical circuit of the vehicle such that the actuator is positioned for selectively actuating the plurality of cylinders for extending the cylinders from the frame of the vehicle such that the cylinders contact the surface wherein the plurality of cylinders is configured for raising the vehicle, the actuator comprising at least one of an electric motor and a hydraulic motor;
a battery operationally coupled to the actuator such that the battery is positioned for powering the actuator, the battery being rechargeable, the battery being operationally coupled to the electrical circuit of the vehicle such that the battery is configured for receiving a charge from an alternator of the vehicle;
a plurality of receivers, each receiver being operationally coupled to a respective cylinder;
a fixed controller coupled to an interior surface of the vehicle, the fixed controller comprising a fixed transmitter such that the fixed controller is positioned for selectively signaling a respective receiver for actuating an associated cylinder for extending the associated cylinder from the frame of the vehicle such that the associated cylinder contacts the surface wherein the plurality of cylinders is configured for raising the vehicle, the fixed controller comprising:
 a fixed housing defining an interior space, the fixed transmitter being coupled to the fixed housing and positioned in the interior space,
 a fixed microprocessor coupled to the fixed housing and positioned in the interior space, the fixed microprocessor being operationally coupled to the fixed transmitter and to the electrical circuit of the vehicle,
 a plurality of fixed switches coupled to the fixed housing, the fixed switches being operationally coupled to the fixed microprocessor wherein each fixed switch is configured for selectively switching for signaling the fixed microprocessor for commanding the fixed transmitter for signaling an associated receiver for actuating an associated cylinder for extending the associated cylinder from the frame of the vehicle such that the associated cylinder contacts the surface wherein the plurality of cylinders is configured for raising the vehicle, and
 a power button coupled to the fixed housing, the power button being operationally coupled to the fixed microprocessor wherein the power button is configured for selectively activating the fixed controller;
a remote controller comprising a remote transmitter such that the remote controller is positioned for selectively signaling a respective receiver for actuating an associated cylinder for extending the associated cylinder from the frame of the vehicle such that the associated cylinder contacts the surface wherein the plurality of cylinders is configured for raising the vehicle, the remote controller comprising:
 a remote housing defining an internal space, the remote transmitter being coupled to the remote housing and positioned in the internal space,
 a remote battery coupled to the remote housing and positioned in the internal space,
 a remote microprocessor coupled to the remote housing and positioned in the internal space, the remote microprocessor being operationally coupled to the remote battery and the remote transmitter, and
 a plurality of remote switches coupled to the remote housing, the remote switches being operationally coupled to the remote microprocessor wherein each remote switch is configured for selectively switching for signaling the remote microprocessor for commanding the remote transmitter for signaling an associated receiver for actuating an associated cylinder for extending the associated cylinder from the frame of the vehicle such that the associated cylinder contacts the surface wherein the plurality of cylinders is configured for raising the vehicle; and
a plurality of pads, each pad being selectively positionable on the surface below a respective cylinder such that the pad is positioned for contacting a respective second plate as the respective cylinder is extended from the frame wherein the pad is configured for stabilizing the vehicle on the surface, the pads comprising at least one of hardened rubber and carbon fiber, the plurality of pads comprising a set of first pads and a set of second pads, each second pad being circumferentially larger than a respective first pad wherein the second pad is configured for providing greater stabilization than the respective first pad.

* * * * *